United States Patent [19]
Onozaki et al.

[11] 3,969,484
[45] July 13, 1976

[54] PROCESS FOR RECOVERING TUNGSTEN FROM ALKALINE LEACHING SOLUTION OF TUNGSTEN ORES

[75] Inventors: Satoshi Onozaki, Mitaka; Shogo Nemoto, Iwaki; Takeshi Hazeyama, Mitaka, all of Japan

[73] Assignee: Nittetsu Mining Company, Ltd., Tokyo, Japan

[22] Filed: Feb. 20, 1975

[21] Appl. No.: 551,240

[30] Foreign Application Priority Data
Mar. 22, 1974 Japan.............................. 49-31446

[52] U.S. Cl.................................. 423/58; 423/55; 423/593; 423/561
[51] Int. Cl.² ................. C01G 39/00; C01G 41/00
[58] Field of Search ................ 423/55, 58, 56, 593, 423/561

[56] References Cited
UNITED STATES PATENTS

| | | | |
|---|---|---|---|
| 2,339,888 | 1/1944 | Smith | 423/58 |
| 2,556,255 | 6/1951 | Carosella | 423/58 |
| 3,158,438 | 11/1964 | Kurtak | 423/55 |
| 3,173,754 | 3/1965 | Kurtak | 423/58 |

Primary Examiner—Herbert T. Carter
Attorney, Agent, or Firm—Oblon, Fisher, Spivak, McClelland & Maier

[57] ABSTRACT

This invention relates to a process for recovering tungsten from an alkaline leaching solution of tungsten ores. This invention comprises adjusting the pH of an alkaline leaching solution which is obtained by lixiviating ore containing tungsten with an alkaline solution to 7–8 with acid to oxidize molybdic acid ions in the solution, adding a sulfide donor, then precipitating molybdenum sulfide compounds by adjusting the pH value of the solution to 2–3, and recovering tungstic acid ions as calcium tungstate by the addition of a calcium ion donor after the molybdenum sulfide compounds are separated.

5 Claims, No Drawings

PROCESS FOR RECOVERING TUNGSTEN FROM ALKALINE LEACHING SOLUTION OF TUNGSTEN ORES

This invention relates to a process for recovering tungsten from an alkaline leaching solution of tungsten ores which contains tungstic acid ions, molybdic acid ions and lower oxides of sulfur. More particularly, it relates specifically to a process for recovering tungsten from a leaching solution of tungsten ores lixiviated by an alkaline solution which comprises separating molybdenum from the alkaline solution which contains tungstic acid ions, molybdic acid ions and lower oxides of sulfur and then recovering tungsten from the residual solution.

Tungsten ores such as scheelite and wolframite which are to be leached are crushed to a fine powder and concentrated by various separation techniques and/or by flotation. The tungsten concentrate in general is accompanied by molybdenum ores and sulfide ores and is absorbed by a concentrator used in the separation step. The molybdenum, and sulfur are, therefore, dissolved together by the concentrator when tungsten is dissolved by an alkaline solution from the tungsten concentrate.

The kinds and the amounts of the impure compounds in the tungsten leaching solution depend on the kind of tungsten ores, processes of separation and/or flotation and chemical treatment. When the tungsten concentrate is lixiviated at high temperatures under high pressures, the leaching solution thus obtained contains molybdic acid ions and lower oxides of sulfur and the like other than tungstic acid ions.

Various processes for separating tungsten and molybdenum from alkaline leaching solution have been proposed. Among them is a method which separates the molybdenum as sulfide compounds and is thought to be the most economical process. However, the molybdic acid ions can not be completely eliminated from the leaching solution by such prior art techniques and since calcium tungstate obtained from the leaching solution is accompanied by molybdenum, the molybdenum must further be eliminated from the calcium tungstate obtained. This elimination is very troublesome unless high grade tungsten ores containing low amounts of molybdenum are utilized for refining.

An object of the present invention is to separate and recover molybdenum completely as molybdenum sulfides from an alkaline leaching solution obtained by the hydrometallurgical processing of tungsten ores.

Another object of the present invention is to recover tungsten as calcium tungstate from the residual solution obtained from the alkaline solution leaching used in the hydrometallurgical processing of tungsten and from which molybdenum has been eliminated.

A still other object of the present invention is to recover tungsten as calcium tungstate which possesses excellent sedimentation rate and dehydration rate from the residual alkaline solution obtained by the hydrometallurgical processing of tungsten ores with an alkaline leaching solution and from which molybdenum has been eliminated.

Briefly, these objects and other objects of the present invention as hereinafter will become more readily apparent, can be achieved by a process which comprises adjusting the pH of an alkaline leaching solution obtained by lixiviating tungsten ores with an alkaline solution to 7–8 with acid, oxidizing molybdic acid ions in the solution, adding over twice the excess of stoichiometric amount of sulfide ion with respect to the weight of the oxidized molybdic acid ions to prepare the complex salt of thiomolybdic acid, adjusting the pH value thereof to 2–3 with acid to precipitate molybdenum sulfides, separating the precipitated molybdenum sulfides from the leaching solution, then precititating calcium tungstate from the residual solution containing tungstic acid ions by conventional techniques, or after the partially reduced tungstic acid ions in the residual solution are oxidized, adding a stoichiometric excess of a calcium ion donor with respect to the weight of tungstic acid ions to the resulting solution, then adjusting the pH value of the obtained solution to below 10 with acid and separating the precipitated calcium tungstate.

A more complete understanding of the present invention and many of the attendant advantages thereof will be obtained by way of the following detailed description.

A leaching solution which was obtained by treating a scheelite flotation concentrate with sodium carbonate solution at high temperature and high pressure. The solution contained, other than sodium tungstate, sodium molybdate, the sodium salt of the lower oxyacid of sulfur and the sodium salt of a fatty acid which was formed by the saponification of the flotation reagents, and was adjusted to various pH values at 50°C. To the solution added sodium hydrosulfide in a stoichiometric excess with respect to the weight of molybdic acid ions to prepare the complex salt of thiomolybdic acid without or after oxidation of the solution, thereafter the pH was adjusted to 2–3 with hydrochloric acid after agitating for 1 hour and lastly cooled to precipitate molybdenum sulfide compounds. The obtained precipitate was removed by filtration.

The results of the tests are shown in Table 1.

Table 1

| Number | $Mo/WO_3 \times 100$ (wt. ratio) of leaching solution | Oxidation | Sodium hydrosulfide | pH At the time sodium hydrosulfide is added | Final | $Mo/WO_3 \times 100$ (wt. ratio) in final filtrate |
|---|---|---|---|---|---|---|
| 1 | 0.45 | No | 3 | 7.5 | 2.5 | 0.055 |
| 2 | 0.45 | No | 6 | 7.5 | 2.5 | 0.034 |
| 3 | 0.45 | Done | 2 | 7.5 | 2.5 | 0.018 |
| 4 | 0.45 | Done | 2.5 | 7.5 | 2.5 | 0.011 |
| 5 | 0.45 | Done | 3 | 7.5 | 2.5 | 0.010 |
| 6 | 0.36 | Done | 2.5 | 10.0 | 2.5 | 0.040 |
| 7 | 0.36 | Done | 2.5 | 7.5 | 2.5 | 0.010 |
| 8 | 0.36 | Done | 2.5 | 5.0 | 2.5 | 0.043 |
| 9 | 1.40 | Done | 2.5 | 7.5 | 1.5 | 0.013 |
| 10 | 1.40 | Done | 2.5 | 7.4 | 2.5 | 0.009 |

Table 1-continued

| Number | Mo/WO₃×100 (wt. ratio) of leaching solution | Oxidation | Sodium hydro-sulfide | pH At the time sodium hydrosulfide is added | Final | Mo/WO₃×100 (wt. ratio) in final filtrate |
|---|---|---|---|---|---|---|
| 11 | 1.40 | Done | 2.5 | 7.4 | 3.5 | 0.017 |

Note: The amount of sodium hydrosulfide added is described in terms of the number of times it is present in excess of the stoichiometric amount of molybdic acid ions.

It was found as shown by the results in Table 1 that the greater part of molybdic acid ions was precipitated as molybdenum sulfides from the solution when the pH of the solution was adjusted to 7.5 with a mineral acid and the molybdic acid ions was oxidized. Sodium hydrosulfide was added to the solution in amounts of twice the stoichiometric amount of the weight of the molybdic acid ions and then the pH of thus obtained solution was adjusted to 2-3 with acid. It was also found that molybdic acid ions are not precipitated completely as molybdenum sulfide compounds (1) when the leaching solution is not oxidized (see Nos. 1 and 2), (2) when the pH of the leaching solution is 10.0 or 5 before the addition of sodium hydrosulfide (see Nos. 6 and 8), and (3) when the final pH of the leaching solution is 1.5 or 3.5 although the pH of the solution is adjusted to 7.5 before the addition of sodium hydrosulfide (see Nos. 9 and 11).

Calcium tungstate is not effectively precipitated from the leaching solution from which molybdenum has been eliminated according to the above process when slaked lime is added as the calcium ion donor to the leaching solution. It is believed that tungstic acid ions are partially reduced when molybdenum sulfide compounds are prepared in the above process. This undesirable result can be prevented by adding the slaked lime to the leaching solution re-oxidized.

The experimental results can be explained as follows:
The experiments were performed with the leaching solution obtained by the above process which was oxidized by blowing air, oxygen or by chlorine into the solution or adding hydrogen peroxide, bleaching powder, or bleaching solution at a temperature of 30°–80°C under the following conditions: (1) Calcium tungstate was precipitated by the addition of slaked lime in amounts in excess of the stoichiometric amount of alkali tungstate without adjusting the pH thereof with hydrochloric acid. (2) Calcium tungstate was precipitated by the addition of slaked lime in excess of the stoichiometric amount of alkali tungstate to precipitate calcium tungstate. Thereafter, the pH of the solution was adjusted with hydrochloric acid.

The results of the experiments are shown in Table 2.

Table 2

| No. | Ca(OH₂)* (times) | Addition of HCl | Final pH of leaching solution | Quality of precipitate WO₃ (%) | CaO (%) | Recovered WO₃ (%) |
|---|---|---|---|---|---|---|
| 12 | 1.25 | No | 11.3 | 71.92 | 20.92 | 99.93 |
| 13 | 1.25 | Done | 10.0 | 73.25 | 20.06 | 99.98 |
| 14 | 1.25 | Done | 8.0 | 75.00 | 19.64 | 99.98 |
| 15 | 1.25 | Done | 5.7 | 75.66 | 19.52 | 99.94 |
| 16 | 1.60 | No | 11.7 | 66.76 | 23.93 | 99.93 |
| 17 | 1.60 | Done | 10.4 | 70.20 | 21.03 | 99.99 |
| 18 | 1.60 | Done | 7.8 | 74.88 | 19.78 | 99.98 |
| 19 | 1.60 | Done | 3.8 | 77.06 | 18.82 | 99.85 |

Note: slaked lime is shown as the number of times in excess of the stoichiometric amount of alkali tungstate.

From the results in Table 2 it is apparent that when the pH value of the suspension containing calcium tungstate precipitate exceeds 10, almost all tungstic acid ions can be precipitated. However, the quality of calcium tungstate deteriorates because of contamination by excess lime in the calcium tungstate. On the other hand, when pH of the suspension is adjusted to below 10, high purity calcium tungstate can be recovered in good yield. The calcium tungstate thus obtained has an excellent sedimentation rate and dehydration rate.

In an embodiment of the present invention, hydrogen sulfide, an alkali sulfide or an alkali hydrosulfide can be preferably used as the sulfide ion donor, and the oxide, chloride or hydroxide of calcium can be used as the calcium ion donor. The added acid is one which does not result in the precipitation of calcium from in the leaching solution, for example, hydrochloric acid, or nitric acid. Air, hydrogen peroxide, bleaching powder, alkali chlorate or alkali nitrite is used as the oxidizing agent for molybdic acid ions and tungstic acid ions. The reaction temperature for the formation of molybdenum sulfide compounds and calcium tungstate is preferably 30°–80°C.

According to the present invention, almost all of the molybdenum in a treated ore can not only be effectively separated from the leaching solution employed to treat ores containing tungsten by an alkaline solution, but also high purity tungsten materials can be economically recovered in good yield.

Example 661 l of a slurry containing 696.4kg of scheelite concentrate from Yaguki Mine (Japan) ($WO_3$ 36.41%, Mo 0.13%, P 0.0264%, As 0.005%, Cu 2.17%, Fe 14.31%, S 4.27%, $SiO_2$ 2.30%, Sn<0.01%, CaO 28.06%) and a hot solution containing 290kg of soda ash were charged into an autoclave (capacity $1.7^{m3}$) and the total volume was increased to $1.2^{m3}$ with water. Lixiviation was conducted at about 215°C for 4 hours while agitating, and the leaching solution was removed after the solution had cooled to 120°C, and the insoluble materials were removed by filtration. 2.1$^{m3}$ of a leaching solution (WO$_3$ 117.1 g/l, Mo 0.41 g/l and pH 10.7) was obtained.

The leaching solution was fed into a reaction vessel (capacity 3$^{m3}$) with an agitator, heated to 50°C while agitating and then the pH thereof was adjusted to 7.4 with concentrated hydrochloric acid. The leaching solution thus treated was added to 1kg of 30% hydrogen peroxide and then was passed into the solution compressed air to oxidize the reduced materials in the leaching solution. Thereafter, 8.2kg of sodium hydrosulfide (NaHS.2H$_2$O) were added and the solution was allowed to stand for 1 hour. The pH of the leaching solution was thereafter, to 2.2 with concentrated hydrochloric acid and the leaching solution was allowed to stand for 1 hour.

The solution thus treated was cooled to 30°C, the precipitated molybdenum sulfide compounds were separated and 10.1kg of the precipitate (WO$_3$ 33.14%, Mo 8.41%) was recovered.

The solution from which molybdenum sulfide was separated was transferred into a reaction vessel (capacity 3$^{m3}$) with an agitator, and then was heated to 50°C with agitation. After the tungstic acid ions in the solution were oxidized by adding 1.5kg of bleaching powder to the solution, 98kg of slaked lime (CaO 72.54%, SiO$_2$ 0.52%, P 0.028%, Fe$_2$O$_3$ 0.12%, S 0.120%, CO$_2$ 2.04%) were added to the solution. The solution thus treated was allowed to stand for 1 hour and then the pH value of the solution was adjusted to 8.8 with concentrated hydrochloric acid left to stand alone again for 1 hour.

Calcium tungstate was precipitated by the above process. The dry weight of the recovered calcium tungstate was 328kg and it contained 73.96% of WO$_3$, 0.006% of Mo, 0.007% of P, 0.000% of As, 0.001% of Cu, 0.04% of Fe, 0.84% of SiO$_2$, 0.005% of Sn, and 19.36% of CaO.

The tungstic acid ions in the solution were completely recovered from the solution as calcium tungstate by the above process.

What is claimed is:

1. A process for recovering tungsten values from an alkaline solution employed in the leaching of tungsten ores containing molybdepum, which comprises:

adjusting the pH of said alkaline leaching solution containing tungsten and molybdenum values to a range of 7–8 with a mineral acid which does not form a precipitate with calcium ions, whereby the molybdenum values and tungsten values exist as molybdic acid and tungstic acid, respectively;

oxidizing said molydbic acid ions in solution; adding at least twice the stoichiometric amount with respect to said molybdic acid of at least one sulfide ion donor selected from the group consisting of hydrogen sulfide, alkali sulfides and alkali hydrosulfide to said molydbic acid containing solution at a temperature of 30°–80°C whereby molybdic acid ions are converted to complex thiomolybdate ions;

adjusting the pH of said sulfide ion treated solution to 2–3 with a mineral acid which does not form a precipitate with calcium ions;

separating the molybdenum sulfide compounds upon cooling which precipitate from pH adjusted solution;

oxidizing said tungstic acid in the molybdenum free solution;

adding at least one calcium ion donor selected from the group consisting of calcium chloride and calcium hydroxide to said tungstic acid containing solution at 30°–80°C which converts tungstic acid ions to calcium tungstate; and cooling said calcium tungstate containing solution to precipitate said calcium tungstate from solution which thereafter is separated from the solution.

2. The process of claim 1, wherein the ores are leached with soda ash solution at high temperatures and under high pressures.

3. The process of claim 1, wherein the pH of said solution to which said calcium compound is added, is adjusted to less than 10 by hydrochloric acid or nitric acid, and then calcium tungstate is separated from the solution after it is cooled.

4. The process of claim 1, wherein the amount of said calcium compound added to said tungstic acid containing solution is in excess of the stoichiometric amount necessary to convert the tungstic ion to calcium tungstate.

5. The process of claim 1, wherein the oxidizing agent used in both oxidation steps is selected from the group consisting of air, ozone, oxygen, chlorine, hydrogen peroxide, bleaching powder, alkali chlorate and alkali nitrite.

* * * * *